United States Patent
Agarwal et al.

(10) Patent No.: US 10,768,997 B2
(45) Date of Patent: Sep. 8, 2020

(54) TAIL LATENCY-BASED JOB OFFLOADING IN LOAD-BALANCED GROUPS

(71) Applicant: International Business Machines Corporation, Armonk, NY (US)

(72) Inventors: Kanak B. Agarwal, Austin, TX (US); Wenzhi Cui, Austin, TX (US); Wesley M. Felter, Austin, TX (US); Yu Gu, Cedar Park, TX (US); Eric J. Rozner, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 718 days.

(21) Appl. No.: 15/368,763

(22) Filed: Dec. 5, 2016

(65) Prior Publication Data

US 2018/0157539 A1 Jun. 7, 2018

(51) Int. Cl.
*G06F 9/50* (2006.01)
*G06F 3/06* (2006.01)
(Continued)

(52) U.S. Cl.
CPC .......... *G06F 9/5083* (2013.01); *G06F 3/0611* (2013.01); *G06F 9/505* (2013.01);
(Continued)

(58) Field of Classification Search
CPC .................. G06F 9/505; G06F 9/5083; G06F 2212/1024; G06F 3/0611; G06F 3/0659; H04L 47/125; H04L 49/15
See application file for complete search history.

(56) References Cited

U.S. PATENT DOCUMENTS 5,031,089 A 7/1991 Liu et al.
6,182,139 B1 1/2001 Brendel
(Continued)

OTHER PUBLICATIONS

Hsu et al. Adrenaline: Pinpointing and Reining in Tail Queries with Quick Voltage Boosting. [online] (Feb. 11). IEEE., pp. 271-282. Retrieved From the Internet <https://ieeexplore.ieee.org/abstract/document/7056039> (Year: 2015).*

(Continued)

*Primary Examiner* — Emerson C Puente
*Assistant Examiner* — Jonathan R Labud
(74) *Attorney, Agent, or Firm* — Garg Law Firm, PLLC; Rakesh Garg; Brian Welle

(57) ABSTRACT

A type of a request that is currently being processed at a system is determined. A distribution is selected from a set of processing time distributions, the distribution forming a model that is applicable to the type. A threshold point is computed for the model. A processing time that exceeds a threshold point processing time is regarded as exhibiting tail latency. Tail latency includes a delay in processing of the request due to a reason other than a utilization of a resource of the system exceeding a threshold utilization and a size of a queue in the system exceeding a threshold size. An evaluation is made that the request will experience tail latency during processing at the system and the processing of the request at the system is aborted. The request is offloaded for processing at a peer system in a load-balanced group of systems.

20 Claims, 8 Drawing Sheets

(51) Int. Cl.
   *H04L 12/803* (2013.01)
   *H04L 12/933* (2013.01)
(52) U.S. Cl.
   CPC .... *G06F 3/0659* (2013.01); *G06F 2212/1024* (2013.01); *H04L 47/125* (2013.01); *H04L 49/15* (2013.01)

(56) References Cited

U.S. PATENT DOCUMENTS

| | | | |
|---|---|---|---|
| 8,863,096 | B1 | 10/2014 | Bucur et al. |
| 2003/0046396 | A1 | 3/2003 | Richter et al. |
| 2003/0108027 | A1 | 6/2003 | Kim et al. |
| 2004/0082294 | A1 | 4/2004 | Ekl et al. |
| 2009/0268747 | A1 | 10/2009 | Kurata et al. |
| 2010/0146082 | A1 | 6/2010 | Isobe |
| 2010/0274885 | A1 | 10/2010 | Yoo et al. |
| 2011/0022812 | A1 | 1/2011 | Van der Linden et al. |
| 2011/0040876 | A1 | 2/2011 | Zhang et al. |
| 2011/0153828 | A1 | 6/2011 | Park et al. |
| 2011/0276699 | A1 | 11/2011 | Pedersen |
| 2012/0278493 | A1 | 11/2012 | Thornburgh et al. |
| 2014/0019602 | A1 | 1/2014 | Murthy et al. |
| 2014/0047104 | A1 | 2/2014 | Rodriguez |
| 2014/0229610 | A1 | 8/2014 | Shen et al. |
| 2014/0310417 | A1 | 10/2014 | Sorenson, III et al. |
| 2015/0078152 | A1 | 3/2015 | Garg et al. |
| 2015/0178359 | A1 | 6/2015 | Grasselt et al. |
| 2015/0332331 | A1* | 11/2015 | Sura .................. G06Q 30/0264 705/14.61 |
| 2016/0162004 | A1 | 6/2016 | Ljubuncic et al. |
| 2016/0328273 | A1 | 11/2016 | Molka et al. |
| 2017/0005863 | A1* | 1/2017 | Falco ..................... H04L 67/02 |
| 2018/0018610 | A1* | 1/2018 | Del Balso ................ G06N 3/08 |
| 2018/0032580 | A1* | 2/2018 | Guz .................... G06F 16/2365 |

OTHER PUBLICATIONS

Jeon et al. TPC: Target-Driven Parallelism Combining Prediction and Correction to Reduce Tail Latency in Interactive Service. [online] (Apr. 6). ACM., pp. 129-141. Retrieved From the Internet <https://dl.acm.org/doi/pdf/10.1145/2872362.2872370> (Year: 2016).* Appendix P, 2016.

Singh et al; TCP-ADA: TCP with adaptive delayed acknowledgement for mobile ad hoc networks, Wireless Communications and Networking Conference, Jul. 19, 2004, WCNC 2004 IEEE, http://ieeexplore.ieee.org/document/1311806/?tp=&arnumber=1311806&url=http:%2F%2Fieeexplore.ieee.org%2Fiel5%2F9178%2F29116%2F01311806.pdf%3Farnumber%3D1311806.

Chen et al; TCP with Delayed Ack for Wireless Networks, Broadband Communications, Networks and Systems, 2006. BROADNETS 2006. 3rd International Conference on Oct. 1-5, 2006, Nov. 5, 2007, http://ieeexplore.ieee.org/document/4374405/?tp=&arnumber=4374405&url=http:%2F%2Fieeexplore.ieee.org%2Fxpls%2Fabs_all.jsp%3Farnumber%3D4374405.

Altman et al; Novel Delayed ACK Techniques for Improving TCP Performance in Multihop Wireless Networks, PWC 2003, LNCS 2775, pp. 237-250, 2003. IFIP International Federation for Information Processing 2003.

Bai et al; PAC: Taming TCP Incest Congestion Using Proactive ACK Control, Network Protocols (ICNP), 2014 IEEE 22nd International Conference on Oct. 21-24, 2014, Dec. 11, 2014, http://ieeexplore.ieee.org/document/6980401/.

Liu et al; RepNet: Cutting Tail Latency in Data Center Networks with Flow Replication, Jan. 26, 2015.

Hsu et al. Adrenaline: Pinpointing and Reining in Tail Queries with Quick Voltage Boosting. [online] (Feb. 11). IEEE., pp. 271-282. Retrieved From the Internet <https:l/ieeexplore.ieee.org/abstract/document/7056039> (Year: 2015).

USPTO, Non Final Office Action, U.S. Appl. No. 15/368,776, dated Dec. 14, 2018.

USPTO, Non Final Office Action, U.S. Appl. No. 15/368,776, dated Oct. 18, 2019.

USPTO, Final Office Action, U.S. Appl. No. 15/368,776, dated Jun. 24, 2019.

USPTO, Advisory Action, U.S. Appl. No. 15/368,776, dated Sep. 12, 2019.

USPTO, Non Final Office Action, U.S. Appl. No. 15/368,800, dated Sep. 6, 2018.

USPTO, Non Final Office Action, U.S. Appl. No. 15/368,800, dated Apr. 19, 2019.

USPTO, Notice of Allowance, U.S. Appl. No. 15/368,800, dated Apr. 19, 2019.

USPTO, Misc Communication, U.S. Appl. No. 15/368,800, dated Jan. 7, 2020.

USPTO, Final Office Action, U.S. Appl. No. 15/368,800, dated Jan. 4, 2019.

USPTO, Advisory Action, U.S. Appl. No. 15/368,800, dated Feb. 7, 2019.

* cited by examiner

TAIL LATENCY-BASED JOB OFFLOADING IN LOAD-BALANCED GROUPS

TECHNICAL FIELD

The present invention relates generally to a method, system, and computer program product for improving job execution performance in load-balanced groups of peer data processing systems. More particularly, the present invention relates to a method, system, and computer program product for tail latency-based job offloading in load-balanced groups.

BACKGROUND

In a load-balanced configuration, a load-balancer system receives requests for service from numerous client systems. Depending on the load-balancing algorithm used therein, the load-balancer sends a received request to one of the systems participating in the load-balanced group of systems serviced by the load-balancer. The system that receives the request from the load-balancer processes the request, or queues the request for processing, depending on the conditions and configuration of the system.

Presently, if a system in a load-balanced group has excessive utilization of the processor, the memory, the network bandwidth, the electrical power, or some other computing resource, the system can offload the request to another peer system in the group. Such presently available offloading is dependent only upon the utilization-related conditions of one or more computing resources in system.

Some other presently available offloading algorithms look at the number of requests pending in a queue in the system. When that queue-size exceeds a threshold, the presently available offloading algorithm offloads one or more requests from the queue to shorten the queue. A request is interchangeably referred to herein as a "job" unless expressly distinguished where used.

SUMMARY

The illustrative embodiments provide a method, system, and computer program product. An embodiment includes a method that determines a type of a request that is currently being processed at a data processing system. The embodiment selects a distribution from a set of processing time distributions, the distribution forming a model that is applicable to the type. The embodiment computes a threshold point for the model, wherein a processing time that exceeds a processing time at the threshold point is regarded as exhibiting tail latency according to the model, tail latency comprising a delay in processing of the request due to a reason other than a utilization of a resource of the data processing system exceeding a threshold utilization and a size of a queue in the data processing system exceeding a threshold size. The embodiment evaluates that the request will experience tail latency during processing at the data processing system. The embodiment aborts, responsive to the evaluating, processing of the request at the data processing system. The embodiment offloads the request for processing at a peer data processing system in a load-balanced group of data processing systems.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
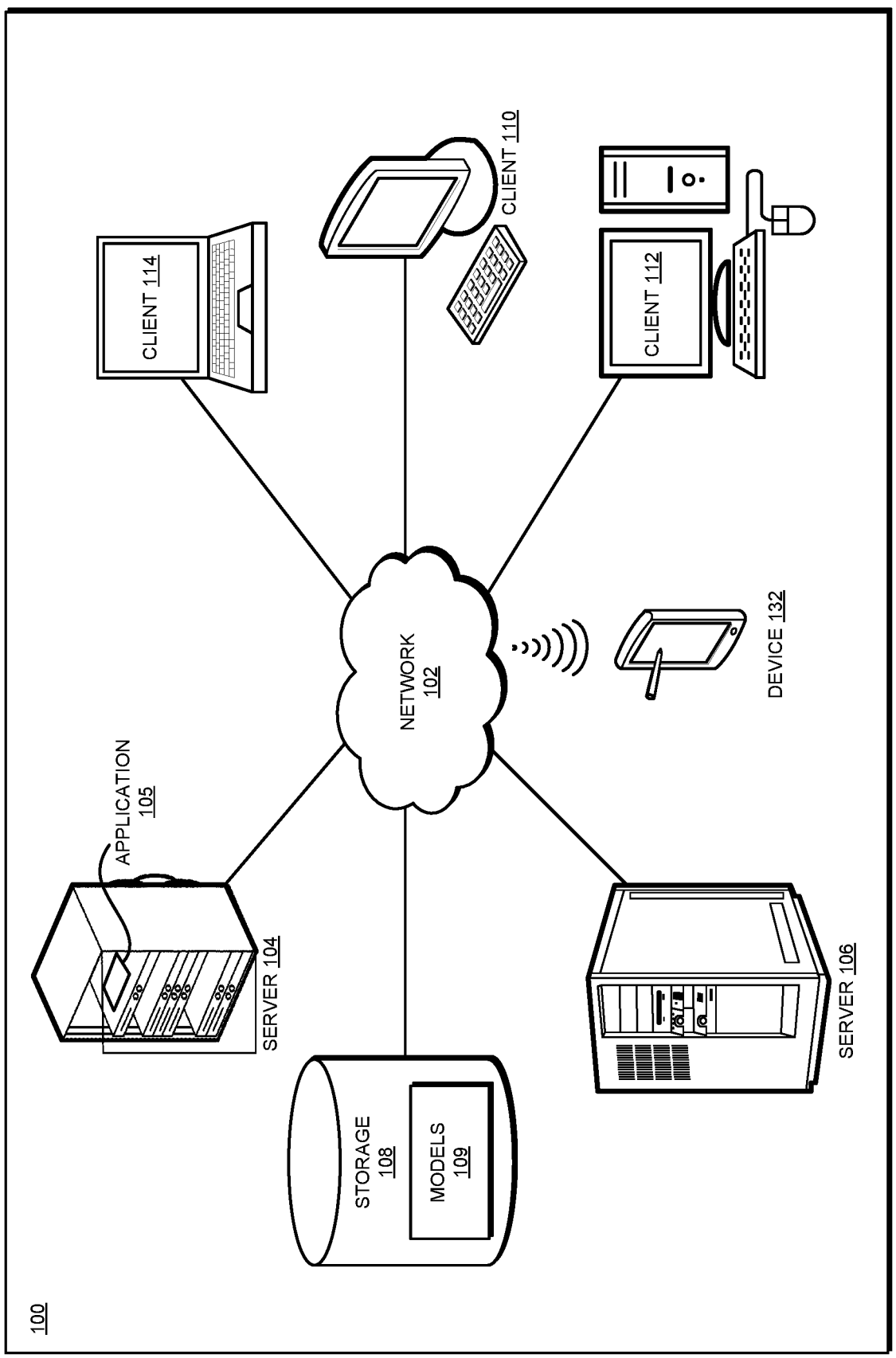
FIG. 1 depicts a block diagram of a network of data processing systems in which illustrative embodiments may be implemented.

The illustrative embodiments recognize that there are instances when a request takes an unusually high time to process. This occurs when other requests of the same or similar type are processed normally within an expected processing duration, but one or more requests of the type take an unusually long time for processing, the system conditions remaining largely unchanged.

In other words, if the processing times of a set of requests of a particular type were plotted, a Bell curve would normally result. The peak of the Bell curve represents the median processing time for the set of requests of that type, and some portion of the curve on each side of the peak represents the expected range of processing times for a significant majority of the requests in the set.

The outliers are those requests that are represented by the far ends of the Bell curve. Some low-side outliers are represented by the end-portion of the curve that represents the shortest processing times. Other high-side outliers are those requests that are represented by the other end-portion of the curve where the processing times exceeded the processing times of the vast majority of the requests.

These high-side outliers are the requests of interest in this disclosure. The inordinately high processing times of a high-side outlier is called a "tail latency". Tail latency has been found to be unrelated to the utilization conditions prevailing in the system. In other words, regardless of the utilization of a computing resource being high or low in the system, a high-side outlier request can have a long tail latency for reasons that are not apparent or related to the utilization conditions.

A system condition is a utilization, scarcity, pre-commitment, or other such resource-related condition existing in a system. In some cases, but not necessarily, tail latency can be explained or controlled by the system conditions. But, in many cases, tail latencies can be caused independent of system conditions. Tail latency can occur when the utilization of a system is below a threshold utilization, a queue-size is below a threshold queue-size, or both. Generally, some idiosyncrasy with other applications executing on the system, the networking stack, the network, the hypervisor, or a hardware component of the system is related to the tail latency.

The illustrative embodiments recognize that some requests are suffer tail latencies while processing. The illustrative embodiments further recognize that utilization-based offloading algorithms, or queue-length-based offloading algorithms will not be able to offload such requests particularly when the utilization and/or the queue length does not justify or trigger the offloading. Consequently, given the presently available offloading algorithms in load-balanced data processing environments, it is likely that a high-side outlier request may suffer a tail latency in a system and yet continue to be queued or processed at the system.

Continuing processing a request that is suffering a tail latency, or is likely to suffer a tail latency, is detrimental to system performance, is undesirable for the user experience, can breach a service level agreement, and can have other undesirable effects. For example, one online retailer has found that every 100 milliseconds of latency costs them one percent in sales. A search engine has found that for an extra 0.5 seconds in search page generation time, the traffic dropped by twenty percent. A broker could lose four million dollars in revenues per millisecond if their trading platform is five milliseconds behind the competition. Many of these delays can be from tail latencies.

The illustrative embodiments recognize that the presently available tools or solutions do not address these needs or provide adequate solutions for these needs. The illustrative embodiments used to describe the invention generally address and solve the above-described problems and other problems related to tail latency-based job offloading in load-balanced groups.

An embodiment can be implemented as a software application. The application implementing an embodiment can be configured as a modification of an existing job processing/queuing/scheduling system, as a separate application that operates in conjunction with an existing job processing/queuing/scheduling system, a standalone application, or some combination thereof.

For example, an embodiment can be implemented in or with a virtual switch on hypervisor, can be a part of an operating system kernel, can be implemented as a part of a server application in a load-balanced server group, can be implemented on a load-balancer, or some combination thereof. Furthermore, an embodiment operates to provide tail latency-based offloading functionality to a system; and in doing so operates separately and independently of any prior-art utilization-based or queue-length-based offloading algorithm that may also be operational for the system.

The illustrative embodiments operate in a model construction mode and an offloading mode. An embodiment operating in the model construction monitors the processing times of the requests as they are processed by a system. The embodiment classifies the requests by type and collects the processing times data by type.

Figure 4:
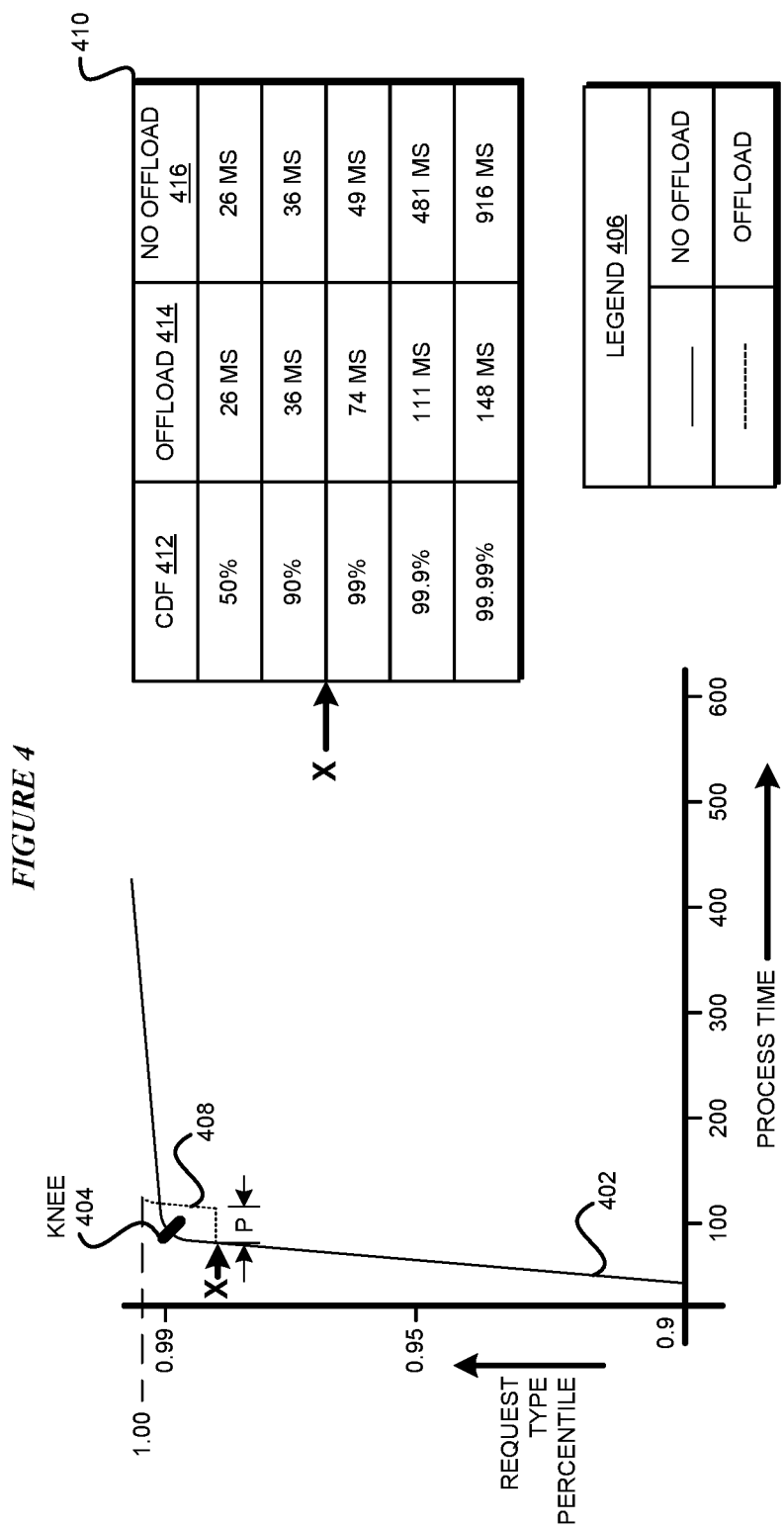
FIG. 4 depicts a graph that is usable to construct a tail latency distribution model in accordance with an illustrative embodiment.

Using only the processing times data of the requests of a particular type, and regardless of any system conditions existing in the system during the processing of those requests, one embodiment constructs a tail latency distribution model for the type. A tail latency distribution model is compactly referred to herein as a "model" unless expressly distinguished where used. A model is a representation of a processing times curve or graph for a type of requests being processed on a system. FIG. 4 depicts an example of a cumulative distribution function of a model. A model has a "knee", which is a significant or sharp deviation in a trend of the model. Typically, the model shows tail latency after a knee.

Another embodiment additionally collects data about the system conditions when the requests of the type are processed in the system. The same or a similar set of requests of a given type can exhibit different processing times under different system conditions. Accordingly, this embodiment constructs more than one models for the same type, each model being applicable to a particular set of system conditions. In other words, when a set of models correspond to a type of requests being processed on a system, different models in the set of models apply to different system conditions existing in the system while processing the requests of that type. It is possible for different models in the set of models corresponding to the type to have the knees located in different locations.

Thus, in the model construction mode, the illustrative embodiments construct one or more models for a type of requests. For example, requests that require web page data for servicing may be one type of requests; requests that require image data response may be another type of requests; requests that require back-end computation for servicing may be another type of requests; requests that require accessing third-party data over a network may be another type of requests; requests that write data to a database may be another type of requests; requests that require encryption or decryption may be one type of requests; and so on. Requests can also be grouped, or further grouped, by a set of services, a set of customers or a set of content.

These examples of types of requests are not intended to be limiting. From this disclosure, those of ordinary skill in the art will be able to conceive many other types of requests, and the same are contemplated within the scope of the illustrative embodiments.

In the offloading mode, an embodiment applies a previously constructed model to decide whether to offload a job. The job may be currently executing, or awaiting execution in a queue.

For example, if only a system condition-agnostic model is available for a type of requests, and a request of the type is to be evaluated for tail latency possibility, the embodiment selects the system condition-agnostic model. If different system condition-specific models are available for a type of requests, and a request of the type is to be evaluated for tail latency possibility, the embodiment selects that model whose system conditions match the prevailing condition in the system when the request is or will be processed. The system conditions match need not be exact, and can be approximated to within a tolerance value.

For a selected model, an embodiment further computes a threshold point on the model. The threshold point need not be at the knee, but can be located before or after the knee, depending on the considerations.

For example, suppose that the knee occurs at ninety-ninth percentile in the selected model. I.e., 99 percent of requests are before the knee and only one percent of the requests suffer from the tail latency. Although not necessary, in many models, the processing time incrementally increases up to the knee and increases significantly after the knee.

If the offloading model is configured conservatively, a threshold point may be set significantly ahead of the knee in the model, e.g., at 97 percentile. If the model is configured optimistically, a threshold point may be set at or after the knee, e.g., at 99 percentile or 99.2 percentile.

One embodiment sets the threshold point statically for all requests of the corresponding type that are or will be processed within a time period. Another embodiment dynamically sets the threshold point on a request-by-request basis, giving consideration to the specific parameters of the requests, the changing system conditions from request-to-request, or for some combination of these and/or other reasons that will be apparent from this disclosure to those of ordinary skill in the art.

A request can be offloaded while the request is being processed, i.e., executed, by the system. In such an offloading scenario, once a model has been selected and a threshold is set, the embodiment determines whether the processing time of the request has already exceeded, or is likely to exceed, the threshold point of the model. If the processing time of the request has already exceeded, or is likely to exceed, the threshold point of the model, the embodiment aborts the processing of the request at the system and offloads the request to a suitably selected peer system in the load-balanced group.

A request can also be offloaded while the request is awaiting processing or execution in a queue. For example, suppose request R0 of type T0 is currently being processed; request R1 of type T1 is first in the queue, request R2 of type T2 is second in the queue, and request R3 of type T3 is third in the queue. An embodiment has to determine whether request R3 should be offloaded for tail latency reasons.

The embodiment selects a model M0 and computes a threshold X0 for request R0. The embodiment determines whether R0 is likely to suffer from a tail latency. The embodiment also computes an estimated time T0 to complete the processing of R0. Similarly, the embodiment determines model M1, threshold X1, and time to complete T1 corresponding to request R1; and model M2, threshold X2, and time to complete T2 corresponding to request R2. The embodiment also selects model M3, and computes threshold X3 and time to complete T3 corresponding to request R3. The embodiment determines whether T0+T1+T2+T3 will exceed X3. If X3 is likely to be exceeded for R3, the embodiment removes R3 from the queue of the system and offloads R3 to a suitably selected peer system in the load-balanced group.

In a similar manner, the embodiment can also compute whether T0+T1+T2 will exceed X2, and make a determination about offloading R2. Determination of offloading R1 can be made in a similar manner.

Recall that the model for some, all, or none of the requests may be system condition-specific. A peer system for offloading can be selected within the load-balanced group in any suitable manner, including but not limited to determining an available capacity at the peer system. The offloading described herein assumes that any server-affinity issues associated with the requests are appropriately handled, such as, but not limited to, preventing offloading of a request that has an affinity to a particular system.

The manner of tail latency-based job offloading in load-balanced groups described herein is unavailable in the presently available methods. A method of an embodiment described herein, when implemented to execute on a device or data processing system, comprises substantial advancement of the functionality of that device or data processing system in offloading the jobs that are experiencing tail latency even when the utilization or the queue size of the system may not justify offloading.

The illustrative embodiments are described with respect to certain types of requests, models, system conditions, algorithms, peer systems, load-balancing, thresholds, tolerances, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
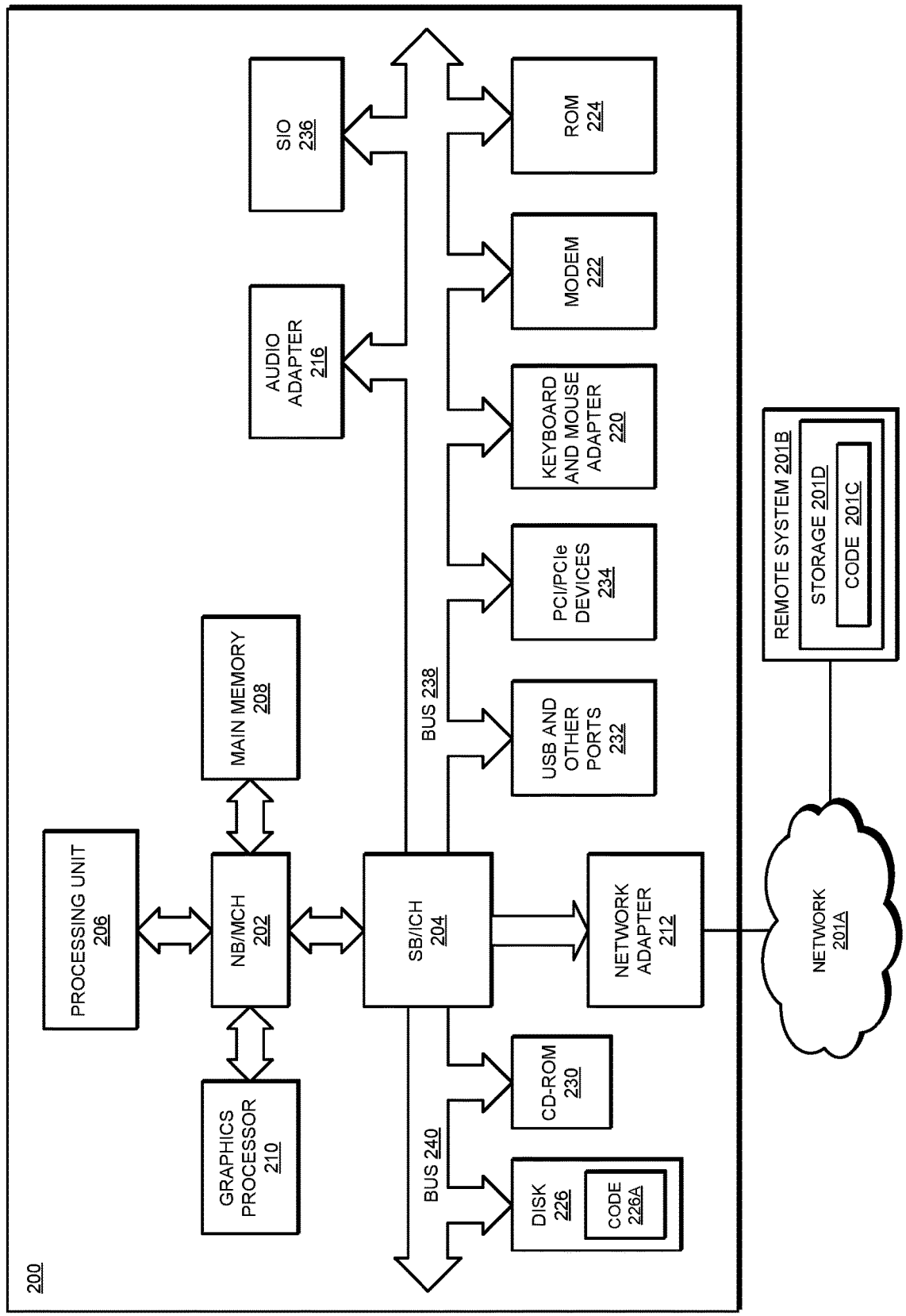
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Models 109 in repository 108 include one or more tail latency distribution models constructed in a manner described herein. In an example operation, application 105 may cause the offloading of a job (not shown) from server 104 to server 106, assuming that servers 104 and 106 are participants in a load-balanced server group.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may Include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
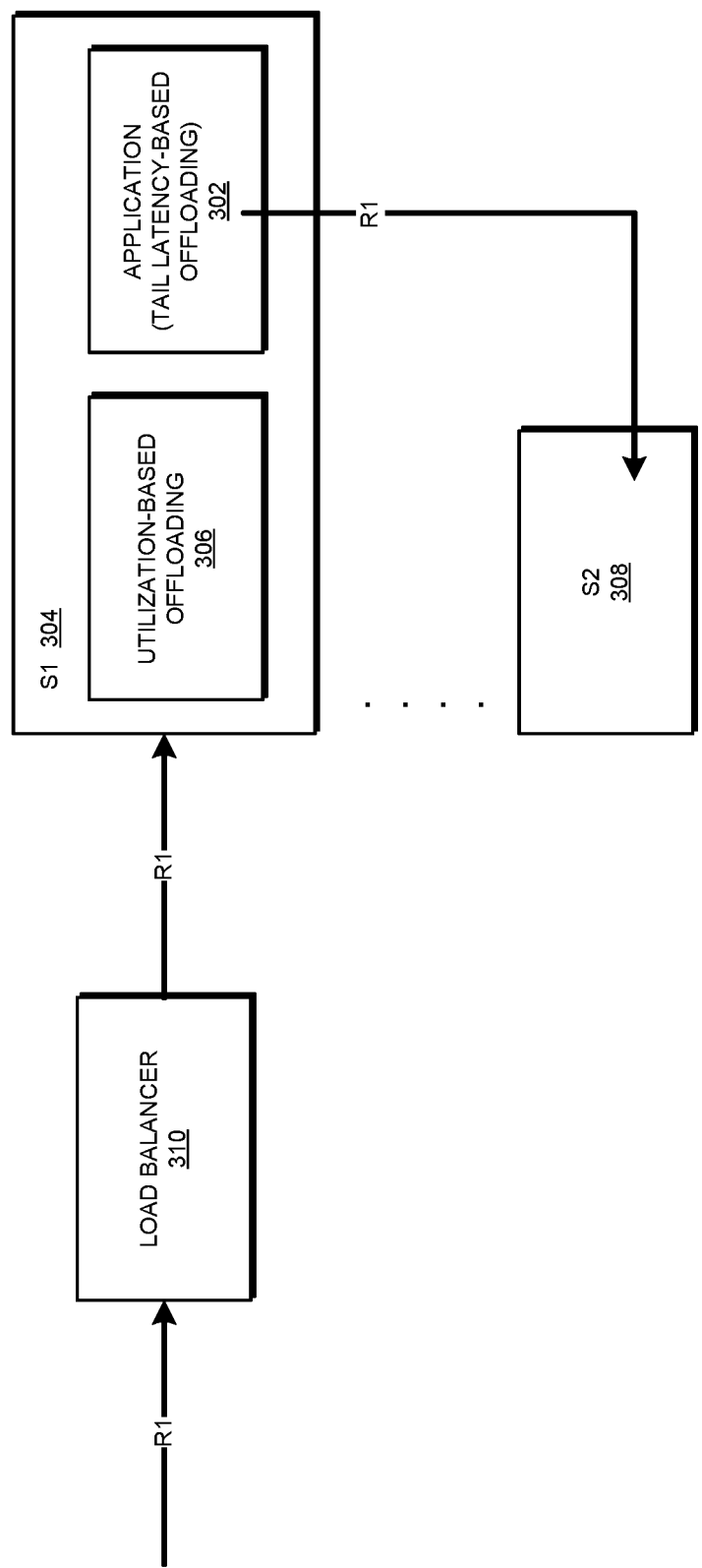
FIG. 3 depicts a block diagram of an example configuration for tail latency-based job offloading in load-balanced groups in accordance with an illustrative embodiment.

With reference to FIG. 3, this figure depicts a block diagram of an example configuration for tail latency-based job offloading in load-balanced groups in accordance with an illustrative embodiment. Application 302 is an example of application 105 in FIG. 1.

Application 302 provides the tail latency-based offloading features to data processing system 304, as described herein. Application 302 may operate and provide this functionality to system 304 without depending upon or interfering with prior-art utilization-based or queue size-based offloading algorithm 306, that may be operating in system 304. Systems 304 and 306 are participants in a load-balanced group managed by load-balancer 310.

In operation, suppose that load-balancer 310 receives request R1 from a client data processing system (not shown). Load-balancer 310 sends R1 to system 304 for processing. Application 302 determines by a method described herein that R1 is actually experiencing tail latency, or is likely to experience tail latency, as described herein. Accordingly, application 302 offloads or sends R1 to system 308 for processing at system 308. Note that algorithm 306 may not find a utilization-based justification or a queue-size based justification for offloading R1 to system 308 at the time application 302 decides to offload R1 due to tail latency.

With reference to FIG. 4, this figure depicts a graph that is usable to construct a tail latency distribution model in accordance with an illustrative embodiment. Application 302 in FIG. 3 is usable in constructing the model corresponding to graph 402. Graph 402 is a simplified, generalized, and clarified graph which shows the general trends observed in request processing where tail latencies occur. Minor variations and fluctuations that would be observable in an actual graph recording have been smoothed for clarity.

Graph 402 shows a slowly increasing trend in processing time from 90 percentile (0.9) up to knee 404, which is shown as a non-limiting example at 99 percentile (0.99). After knee 404, a significant and rapidly increasing trend in processing time is seen, which leads to the tail latency in those jobs that are in the non-limiting example 99-100 percentile after knee 404.

Legend 406 shows that graph 402 in solid line is the graph of the processing when jobs are not offloaded due to tail latency. Graph 408—in dotted line according to legend 406—occurs when offloading due to tail latency is implemented according to an embodiment.

Table 410 shows points from the cumulative distribution function (CDF), which is indicative of the percentile of the requests, in column 412. Column 414 shows the processing time for requests in certain percentiles when tail latency-based offloading is implemented. Column 416 shows the processing time for requests in certain percentiles when tail latency-based offloading is not implemented.

The CDF can be directly derived from a bell curve, and vice versa. In this graph, 90 percent of the offloaded requests complete in less than or equal to 36 ms, 99 percent of the offloaded requests complete in less than or equal to 74 ms, 99.9 percent of the offloaded requests complete in less than 111 ms, and the rest of the offloaded requests complete in 148 ms or less.

Suppose that threshold X is computed to lie somewhere before knee 404 as shown. When the job processing time exceeds X, or is likely to exceed X, an embodiment offloads the job. The cost of offloading is depicted as time P. As is evident from graphs 402 and 408, while there is a cost to the offloading, jobs in the 99-100 percentile will still finish significantly sooner at the peer system as compared to lingering in the original system with tail latencies.

Some example processing times in table 410 illustrate this benefit. While jobs in less than the threshold X percentile show the same processing times with or without the offloading, jobs in percentiles exceeding the threshold X show two behaviors—jobs right at knee 404 suffer a slight degradation due to the cost of the offloading as described herein, but jobs clearly in the tail latency area of graph 402 show significantly reduced times due to the offloading.

Figure 5:
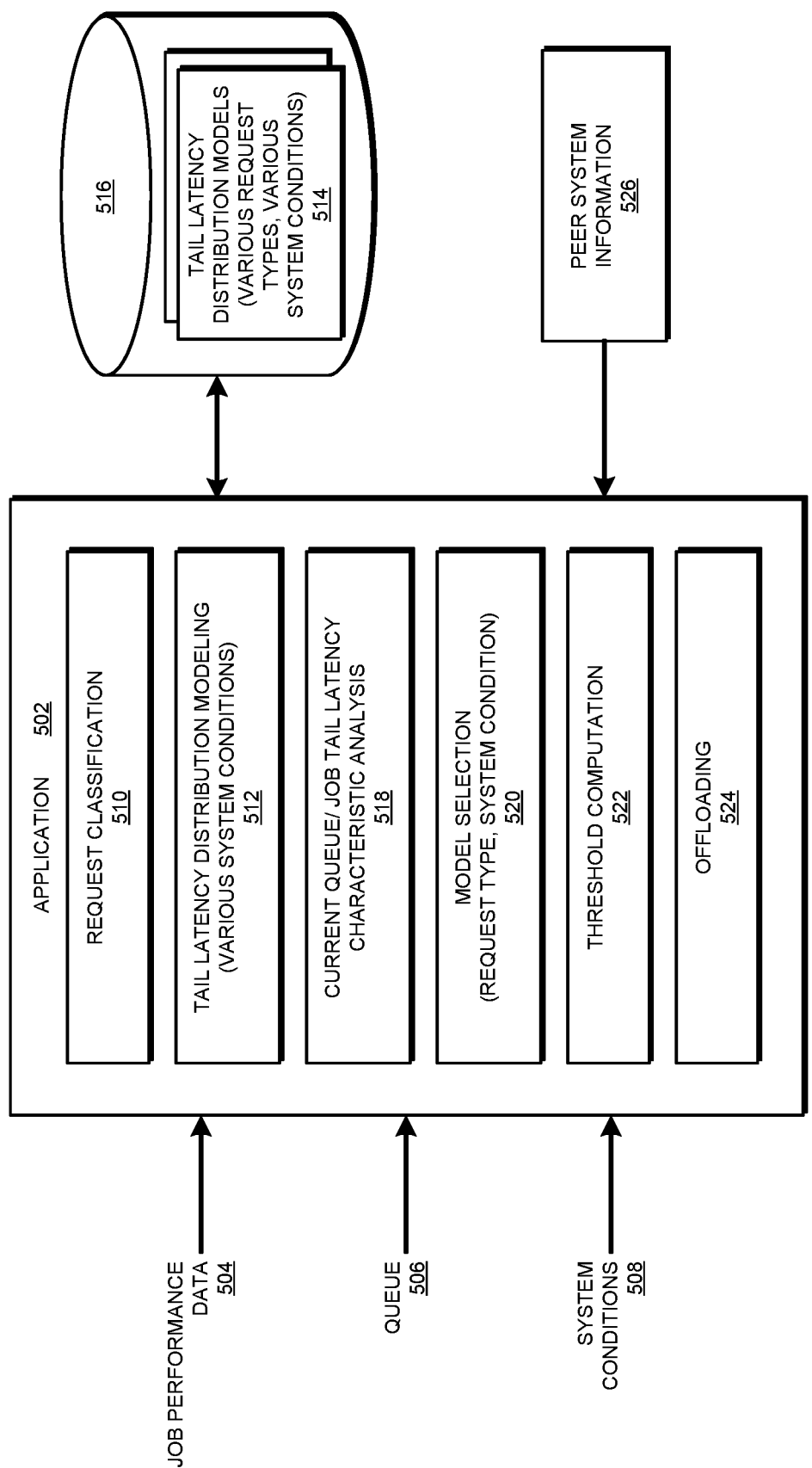
FIG. 5 depicts a block diagram of an example configuration for tail latency-based job offloading in load-balanced groups in accordance with an illustrative embodiment.

With reference to FIG. 5, this figure depicts a block diagram of an example configuration for tail latency-based job offloading in load-balanced groups in accordance with an illustrative embodiment. Application 502 is an example of application 302 in FIG. 3.

Application 502 receives job performance data input 504 from the system with which application 502 is associated. Jobs of various types are executing on the system, and the execution produces job performance data 504. Queue state 506 provides information about jobs that are in a queue awaiting execution at the system. System conditions input 508 includes information about one or more conditions existing at the system, as described herein.

Components 510 and 512 operate in the model construction mode described earlier. Component 510 classifies the jobs or requests into different types in a manner described herein. Component 512 uses job performance data 504 alone or in combination with system conditions 508 to produce one or more models corresponding to a type of a job identified by component 510.

Operating in the model construction mode, component 512 produces one or more models 514 corresponding to one or more types. Models 514 are examples of models 109 in FIG. 1. Models 514 are stored in repository 516, which is an example of repository 108 in FIG. 1.

Components 518, 520, 522, and 524 operate in the offloading mode. Component 518 analyzes a currently executing or queued request for tail latency characteristics. Component 520 selects a suitable model from models 516 for the request being analyzed by component 520. Component 522 computes a threshold corresponding to the model for the analysis as described herein.

If component 520 determines that the request should be offloaded, component 524 uses information 526 about the peer systems to select a suitable peer system for the offloading. Component 524 offloads the executing or queued request, as the case may be, to the selected peer system in a manner described herein.

Figure 6:
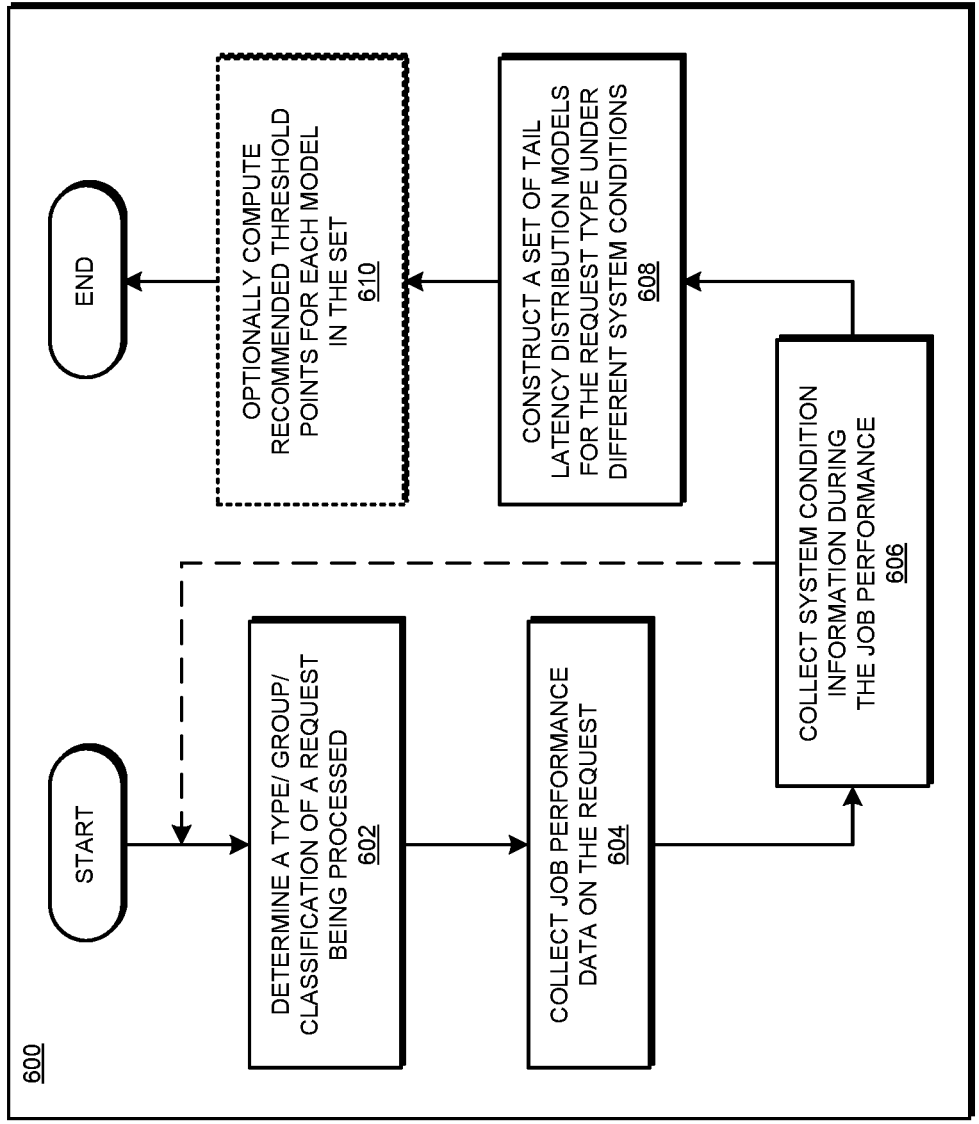
FIG. 6 depicts a flowchart of an example process for model construction in accordance with an illustrative embodiment.

With reference to FIG. 6, this figure depicts a flowchart of an example process for model construction in accordance with an illustrative embodiment. Process 600 can be implemented using application 502 in FIG. 5.

The application determines a type of a request being processed at a system (block 602). The application collects job performance data from the request execution (block 604). When configured to construct system condition-specific models, the application also collects one or more types of system condition information during the job performance (block 606). The application repeats blocks 602-606 for several requests.

The application constructs a set of tail latency distribution models for the request type under different system conditions (block 608). When a system condition-agnostic model is to be created, the application omits block 606 and constructs a model based on the job performance data alone in block 608.

The application optionally also computes a recommended threshold point (X) for a model (block 510). The recommended threshold point can be used by component 522 of FIG. 5 as a default threshold point, avoiding any computation thereof and expediting the offloading process under certain circumstances. The application ends process 600 thereafter.

Figure 7:
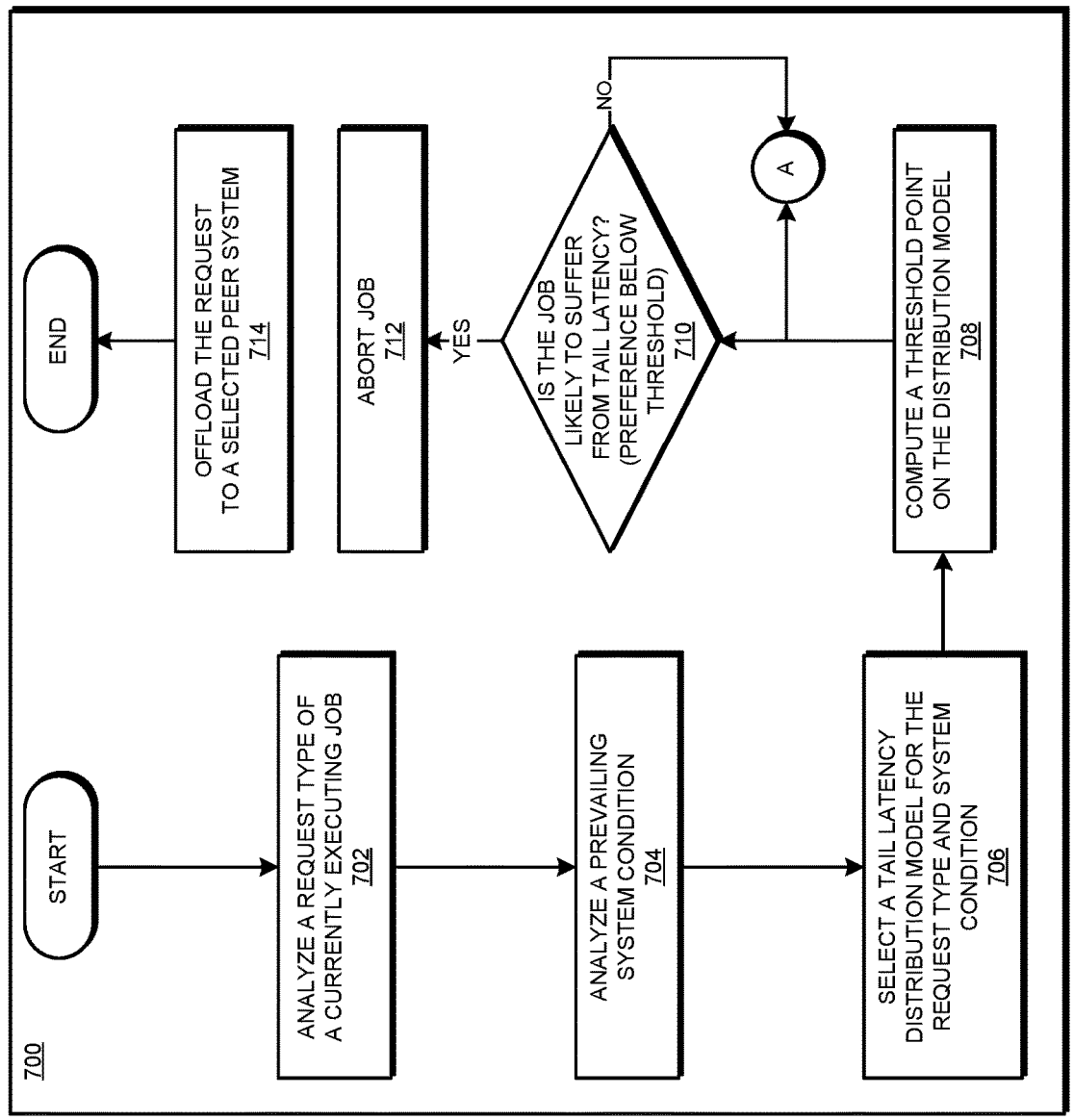
FIG. 7 depicts a flowchart of an example process for tail latency-based job offloading in load-balanced groups in accordance with an illustrative embodiment.

With reference to FIG. 7, this figure depicts a flowchart of an example process for tail latency-based job offloading in load-balanced groups in accordance with an illustrative embodiment. Process 700 can be implemented using application 502 in FIG. 5.

The application analyzes a request currently being executed to determine the request's type (block 702). If a system condition-specific model is to be used, the application analyzes a prevailing system condition (block 704). The application selects a model corresponding to the request type and the prevailing system conditions (block 706).

The application computes a threshold point on the model (block 708). The application may either proceed to block 710, if the currently executing request is to be considered for offloading, or enter process 800 of FIG. 8 via exit point "A" if a request waiting in the queue is to be considered for offloading, or both.

When a currently executing request is to be considered for offloading, the application determines whether the request is actually suffering, or is likely to suffer from tail latency (block 710). As a non-limiting example, the application may make the determination of block 710 by determining whether a processing time of the job has already exceeded a threshold or is likely to exceed the threshold given the amount of progress made with the request thus far in the processing.

If the tail latency is occurring or is likely with the currently executing request ("Yes" path of block 710), the application aborts the processing of the request (block 712).

The application offloads the request to a selected peer system (block 714). The application ends process 700 thereafter. If the tail latency is unlikely in the currently processing request ("No" path of block 710), it is still likely that a queued request might be delayed long enough to be regarded as experiencing tail latency, and therefore, the application exits process 700 at exit point "A to enter process 800 of FIG. 8.

Figure 8:
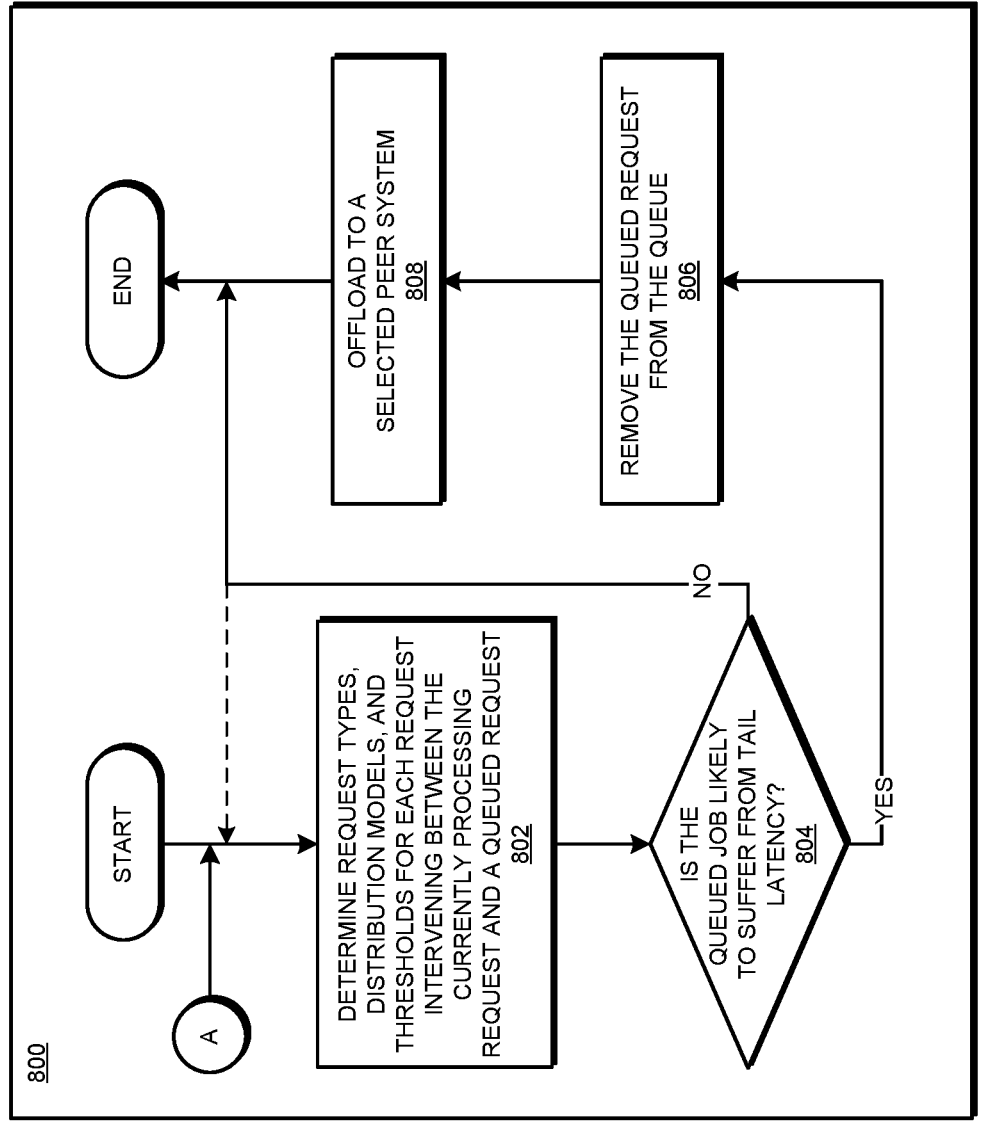
FIG. 8 depicts a flowchart of another example process for tail latency-based job offloading in load-balanced groups in accordance with an illustrative embodiment.

With reference to FIG. 8, this figure depicts a flowchart of another example process for tail latency-based job offloading in load-balanced groups in accordance with an illustrative embodiment. Process 800 can be implemented using application 502 in FIG. 5.

The application enters from process 700 of FIG. 7 via entry point "A" and determines the request types, applicable models, and thresholds for each intervening request in a queue between the currently executing request and a particular queued request in the queue (block 802). In a manner described herein, the application determines whether the queued request is likely to suffer from tail latency (block 804). If tail latency is unlikely for the particular queued request ("No" path of block 804), the application either ends process 800 thereafter, or returns to block 802 to evaluate other queued requests in a similar manner.

If tail latency is likely for the particular queued request ("Yes" path of block 804), the application removes the particular queued request from the queue (block 806). The application offloads the removed request to a suitably selected peer system (block 808). The application ends process 800 thereafter.

Thus, a computer implemented method, system or apparatus, and computer program product are provided in the illustrative embodiments for tail latency-based job offloading in load-balanced groups and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   determining a type of a request that is currently being processed at a data processing system;
   selecting a distribution from a set of processing time distributions, the distribution forming a model that is applicable to the type;
   computing a threshold point for the model, wherein a processing time that exceeds a processing time at the threshold point is regarded as exhibiting tail latency according to the model, tail latency comprising a delay in processing of the request due to a reason other than a utilization of a resource of the data processing system exceeding a threshold utilization and a size of a queue in the data processing system exceeding a threshold size;
   evaluating that the request will experience tail latency during processing at the data processing system;
   aborting, responsive to the evaluating and prior to the request reaching the threshold, processing of the request at the data processing system;
   offloading the request for processing at a peer data processing system in a load-balanced group of data processing systems;
   identifying a first queued request in the queue of the data processing system, the first queued request awaiting processing at the data processing system;
   determining a first type of the first queued request;
   selecting a first model from a first subset of the set of models, the first model corresponding to the first type;
   estimating a first processing time of the first queued request using the first model;
   evaluating that the first processing time will exceed a first acceptable processing time for the first queued request;
   removing, responsive to the first processing time exceeding the first acceptable processing time, the first queued request from the queue; and
   offloading the first queued request for processing at a second peer data processing system in the load-balanced group of data processing systems.

2. The method of claim 1, further comprising:
   determining an amount of processing time already consumed in processing the request;
   estimating an amount of time needed to complete the processing of the request based on an amount of progress made in the processing time already consumed; and
   computing, as a part of the evaluating, whether the processing time already consumed and the time needed to complete together exceed the processing time at the threshold point in the model.

3. The method of claim 1, further comprising:
   determining a system condition prevailing during processing of the request, wherein the system condition is a state of a component of the data processing system; and
   selecting, responsive to the system condition, the model from a subset of the set of tail latency distribution models, wherein the subset of the set of tail latency distribution models comprises a plurality of models corresponding to the type, and wherein the model in the subset corresponds to the system condition and another model in the subset corresponds to a different system condition.

4. The method of claim 3, wherein the system condition is a specific application executing on the data processing system during the processing of the request.

5. The method of claim 3, wherein the system condition is a specific hardware component being selected for use in the data processing system during the processing of the request.

6. The method of claim 3, wherein the system condition is a network condition existing in a network coupled to the data processing system during the processing of the request.

7. The method of claim 1, further comprising:
   identifying a second queued request in the queue of the data processing system, the second queued request awaiting processing at the data processing system;
   determining a second type of the second queued request;

selecting a second model from a second subset of the set of models, the second model corresponding to the second type;

estimating a second processing time of the second queued request using the second model;

evaluating that a total time to process the second request will exceed a second acceptable processing time for the second queued request;

removing, responsive to the total time to process the second request exceeding the second acceptable processing time, the second queued request from the queue; and offloading the second queued request for processing at a third peer data processing system in the load-balanced group of data processing systems.

8. The method of claim 7, further comprising:

determining, as a part of the evaluating that the total time to process the second request will exceed the second acceptable processing time for the second request, whether a total of (i) an estimated processing time of the request, (ii) the second processing time, and (iii) a processing time of each queued request before the second queued request, exceeds the second acceptable processing time for the second request, wherein the first request is one of the queued requests before the second queued request.

9. A computer usable program product comprising a computer-readable storage medium, and program instructions stored on the computer-readable storage medium, the stored program instructions comprising:

program instructions to determine a type of a request that is currently being processed at a data processing system;

program instructions to select a distribution from a set of processing time distributions, the distribution forming a model that is applicable to the type;

program instructions to compute a threshold point for the model, wherein a processing time that exceeds a processing time at the threshold point is regarded as exhibiting tail latency according to the model, tail latency comprising a delay in processing of the request due to a reason other than a utilization of a resource of the data processing system exceeding a threshold utilization and a size of a queue in the data processing system exceeding a threshold size;

program instructions to evaluate that the request will experience tail latency during processing at the data processing system;

program instruction to abort, responsive to the evaluating and prior to the request reaching the threshold, processing of the request at the data processing system; and program instructions to offload the request for processing at a peer data processing system in a load-balanced group of data processing systems;

program instructions to identify a first queued request in the queue of the data processing system, the first queued request awaiting processing at the data processing system;

program instructions to determine a first type of the first queued request;

program instruction to select a first model from a first subset of the set of models, the first model corresponding to the first type;

program instruction to estimate a first processing time of the first queued request using the first model;

program instructions to evaluate that the first processing time will exceed a first acceptable processing time for the first queued request;

program instructions to remove, responsive to the first processing time exceeding the first acceptable processing time, the first queued request from the queue; and program instructions to offload the first queued request for processing at a second peer data processing system in the load-balanced group of data processing systems.

10. The computer usable program product of claim 9, further comprising:

program instructions to determine an amount of processing time already consumed in processing the request;

program instructions to estimate an amount of time needed to complete the processing of the request based on an amount of progress made in the processing time already consumed; and program instructions to compute, as a part of the evaluating, whether the processing time already consumed and the time needed to complete together exceed the processing time at the threshold point in the model.

11. The computer usable program product of claim 9, further comprising:

program instructions to determine a system condition prevailing during processing of the request, wherein the system condition is a state of a component of the data processing system; and program instructions to select, responsive to the system condition, the model from a subset of the set of tail latency distribution models, wherein the subset of the set of tail latency distribution models comprises a plurality of models corresponding to the type, and wherein the model in the subset corresponds to the system condition and another model in the subset corresponds to a different system condition.

12. The computer usable program product of claim 11, wherein the system condition is a specific application executing on the data processing system during the processing of the request.

13. The computer usable program product of claim 11, wherein the system condition is a specific hardware component being selected for use in the data processing system during the processing of the request.

14. The computer usable program product of claim 11, wherein the system condition is a network condition existing in a network coupled to the data processing system during the processing of the request.

15. The computer usable program product of claim 9, further comprising:

program instructions to identify a second queued request in the queue of the data processing system, the second queued request awaiting processing at the data processing system;

program instructions to determine a second type of the second queued request;

program instructions to select a second model from a second subset of the set of models, the second model corresponding to the second type;

program instructions to estimate a second processing time of the second queued request using the second model;

program instructions to evaluate that a total time to process the second request will exceed a second acceptable processing time for the second queued request;

program instructions to remove, responsive to the total time to process the second request exceeding the second acceptable processing time, the second queued request from the queue; and program instructions to offload the second queued request for processing at a third peer data processing system in the load-balanced group of data processing systems.

16. The computer usable program product of claim 15, further comprising:
program instructions to determine, as a part of the evaluating that the total time to process the second request will exceed the second acceptable processing time for the second request, whether a total of (i) an estimated processing time of the request, (ii) the second processing time, and (iii) a processing time of each queued request before the second queued request, exceeds the second acceptable processing time for the second request, wherein the first request is one of the queued requests before the second queued request.

17. The computer usable program product of claim 9, wherein the program instructions are stored in the computer readable storage medium in a data processing system, and wherein the program instructions are transferred over a network from a remote data processing system.

18. The computer usable program product of claim 9, wherein the program instructions are stored in the computer readable storage medium in a server data processing system, and wherein the program instructions are downloaded over a network to a remote data processing system for use in a computer readable storage medium associated with the remote data processing system.

19. A computer system comprising one or more processors, one or more computer-readable memories, and one or more computer-readable storage media, and program instructions stored on at least one of the one or more storage media for execution by at least one of the one or more processors via at least one of the one or more memories, the stored program instructions comprising:
program instructions to determine a type of a request that is currently being processed at a data processing system;
program instructions to select a distribution from a set of processing time distributions, the distribution forming a model that is applicable to the type;
program instructions to compute a threshold point for the model, wherein a processing time that exceeds a processing time at the threshold point is regarded as exhibiting tail latency according to the model, tail latency comprising a delay in processing of the request due to a reason other than a utilization of a resource of the data processing system exceeding a threshold utilization and a size of a queue in the data processing system exceeding a threshold size;
program instructions to evaluate that the request will experience tail latency during processing at the data processing system;
program instructions to abort, responsive to the evaluating and prior to the request reaching the threshold, processing of the request at the data processing system;
program instructions to offload the request for processing at a peer data processing system in a load-balanced group of data processing systems;
program instructions to identify a first queued request in the queue of the data processing system, the first queued request awaiting processing at the data processing system;
program instructions to determine a first type of the first queued request;
program instruction to select a first model from a first subset of the set of models, the first model corresponding to the first type;
program instruction to estimate a first processing time of the first queued request using the first model;
program instructions to evaluate that the first processing time will exceed a first acceptable processing time for the first queued request;
program instructions to remove, responsive to the first processing time exceeding the first acceptable processing time, the first queued request from the queue; and
program instructions to offload the first queued request for processing at a second peer data processing system in the load-balanced group of data processing systems.

20. The computer system of claim 19, further comprising:
program instructions to determine an amount of processing time already consumed in processing the request;
program instructions to estimate an amount of time needed to complete the processing of the request based on an amount of progress made in the processing time already consumed; and
program instructions to compute, as a part of the evaluating, whether the processing time already consumed and the time needed to complete together exceed the processing time at the threshold point in the model.

* * * * *